(12) United States Patent
Mavureddi Dhanasekaran et al.

(10) Patent No.: US 12,627,490 B2
(45) Date of Patent: May 12, 2026

(54) REKEYING IN AUTHENTICATION AND KEY MANAGEMENT FOR APPLICATIONS IN COMMUNICATION NETWORK

(71) Applicant: Nokia Technologies Oy, Espoo (FI)

(72) Inventors: Ranganathan Mavureddi Dhanasekaran, Munich (DE); Saurabh Khare, Bangalore (IN); Suresh Nair, Estero, FL (US)

(73) Assignee: Nokia Technologies Oy, Espoo (FI)

( * ) Notice: Subject to any disclaimer, the term of this patent is extended or adjusted under 35 U.S.C. 154(b) by 399 days.

(21) Appl. No.: 18/307,952

(22) Filed: Apr. 27, 2023

(65) Prior Publication Data

US 2024/0154803 A1    May 9, 2024

Related U.S. Application Data

(60) Provisional application No. 63/336,531, filed on Apr. 29, 2022.

(51) Int. Cl.
*H04L 9/08* (2006.01)
(52) U.S. Cl.
CPC .................................. *H04L 9/0891* (2013.01)
(58) Field of Classification Search
CPC .................................................... H04L 9/0891
USPC ........................................................ 713/171
See application file for complete search history.

(56) References Cited

U.S. PATENT DOCUMENTS

| | | | | |
|---|---|---|---|---|
| 8,948,378 B2 * | 2/2015 | Sowa | .................... | H04W 12/04 380/33 |
| 12,052,358 B2 * | 7/2024 | Palanigounder | ........ | H04L 9/088 |
| 2023/0199483 A1 * | 6/2023 | Kunz | .................... | H04L 9/0866 713/171 |
| 2024/0397317 A1 * | 11/2024 | Rajadurai | ............. | H04W 12/06 |

OTHER PUBLICATIONS

"3rd Generation Partnership Project; Technical Specification Group Services and System Aspects; Security architecture and procedures for 5G system (Release 17)", 3GPP TS 33.501, V17.4.2, Jan. 2022, pp. 1-287.
"New WID on Study of Security aspect of home network triggered primary authentication", 3GPP TSG-SA3 Meeting #105-e, S3-220538, Agenda: 4.18, Huawei, Feb. 14-25, 2022, 3 pages.
"3rd Generation Partnership Project; Technical Specification Group Services and System Aspects; Authentication and Key Management for Applications (AKMA) based on 3GPP credentials in the 5G System (5GS) (Release 17)", 3GPP TS 33.535, V17.4.0, Dec. 2021, 24 pages.

(Continued)

*Primary Examiner* — Dereena T Cattungal
(74) *Attorney, Agent, or Firm* — Ryan, Mason & Lewis, LLP

(57) ABSTRACT
Techniques for authentication and key management for applications (AKMA) in a communication network are disclosed. For example, a method comprises receiving an indication from an application function that a first expiry time of a first application function key, generated using a first random value and configured to enable user equipment to participate in a session with the application function, has expired. The method generates a second application function key for the application function, using a second random value, with a second expiry time.

20 Claims, 10 Drawing Sheets

(56)     References Cited

OTHER PUBLICATIONS

Dekok, "The Network Access Identifier", RFC 7542, Internet Engineering Task Force (IETF), May 2015, pp. 1-30.

"3rd Generation Partnership Project; Technical Specification Group Services and System Aspects; Generic Authentication Architecture (GAA): Generic Bootstrapping Architecture (GBA) (Release 17)", 3GPP TS 33.220, V17.2.0, Dec. 2021, pp. 1-103.

"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.

"3rd Generation Partnership Project; Technical Specification Group Services and System Aspects; Procedures for the 5G System (5GS); Stage 2 (Release 17)", 3GPP TS 23.502, V17.4.0, Mar. 2022, pp. 1-738.

"3rd Generation Partnership Project; Technical Specification Group Services and System Aspects; Generic Authentication Architecture (GAA); Access to network application functions using Hypertext Transfer Protocol over Transport Layer Security (HTTPS) (Release 17)", 3GPP TS 33.222, V17.1.0, Dec. 2021, 37 pages.

U.S. Appl. No. 18/306,147, "Hierarchical Consent in a Communication Network", filed Apr. 24, 2023, pp. 1-20.

"Solution on Kaf refresh without primary authentication—UA*", 3GPP TSG-SA3 Meeting #107Adhoc-e, S3-221354, Agenda: 5.7, Nokia, Jun. 27-Jul. 1, 2022, 3 pages.

"Solution on Kaf refresh without primary authentication—AAnF", 3GPP TSG-SA3 Meeting #107Adhoc-e, S3-221355, Agenda: 5.7, Nokia, Jun. 27-Jul. 1, 2022, 3 pages.

* cited by examiner

400-B

TRUSTED AF CASE

APPLICATION SESSION ESTABLISHMENT REQUEST (A-KID)

$K_{AF1}$ LIFETIME EXPIRES

Naanf_AKMA_ApplicationKey_GET_REQUEST
(A-KID, AF_ID1, KEY EXPIRY INDICATION)

$K_{AKMA}$

AF_ID1

RAND1

KDF $K_{AF1}$

NEW $K_{AF1}$

Naanf_AKMA_ApplicationKey_GET_RESPONSE
($K_{AF1}$, $K_{AF1}$ EXPTIME, SUPI, RAND1)

APPLICATION SESSION ESTABLISHMENT RESPONSE (RAND1)

$K_{AKMA}$

AF_ID1

RAND1

KDF $K_{AF1}$

REKEYING IN AUTHENTICATION AND KEY MANAGEMENT FOR APPLICATIONS IN COMMUNICATION NETWORK

FIELD

The field relates generally to communication networks, and more particularly, but not exclusively, to security management in such communication networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with access to application functions can present a significant challenge.

SUMMARY

Illustrative embodiments provide rekeying techniques for authentication and key management for applications (AKMA) in a communication network.

For example, in one illustrative embodiment, a method comprises receiving an indication from an application function that a first expiry time of a first application function key, generated using a first random value and configured to enable user equipment to participate in a session with the application function, has expired. The method generates a second application function key for the application function, using a second random value, with a second expiry time.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide for AKMA procedures to generate a new application function key (rekey) for an application function session between a UE and a specific application function without the need to reauthenticate, thus avoiding a need to update other keys associated with a current AKMA context.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other details that one of ordinary skill in the art will realize. For example, TS 33.535 entitled, "Technical Specification Group Services and System Aspects; Authentication and Key Management for Applications (AKMA) Based on 3GPP Credentials in the 5G System (5GS)," TS 33.222 entitled, "Technical Specification Group Services and System Aspects; Generic Authentication Architecture (GAA); Access to Network Application Functions Using Hypertext Transfer Protocol over Transport Layer Security (HTTPS)," and TS 33.220 entitled, "Technical Specification Group Services and System Aspects; Generic Authentication Architecture (GAA); Generic Bootstrapping Architecture (GBA)," the disclosures of which are incorporated by reference herein in their entireties, may also be mentioned below in the context of some illustrative embodiments. However, while well-suited for 5G-related 3GPP standards, embodiments are not necessarily intended to be limited to any particular standards.

Prior to describing illustrative embodiments, a general description of certain main components of a 5G network will be described below in the context of FIGS. 1 and 2.

Figure 1:
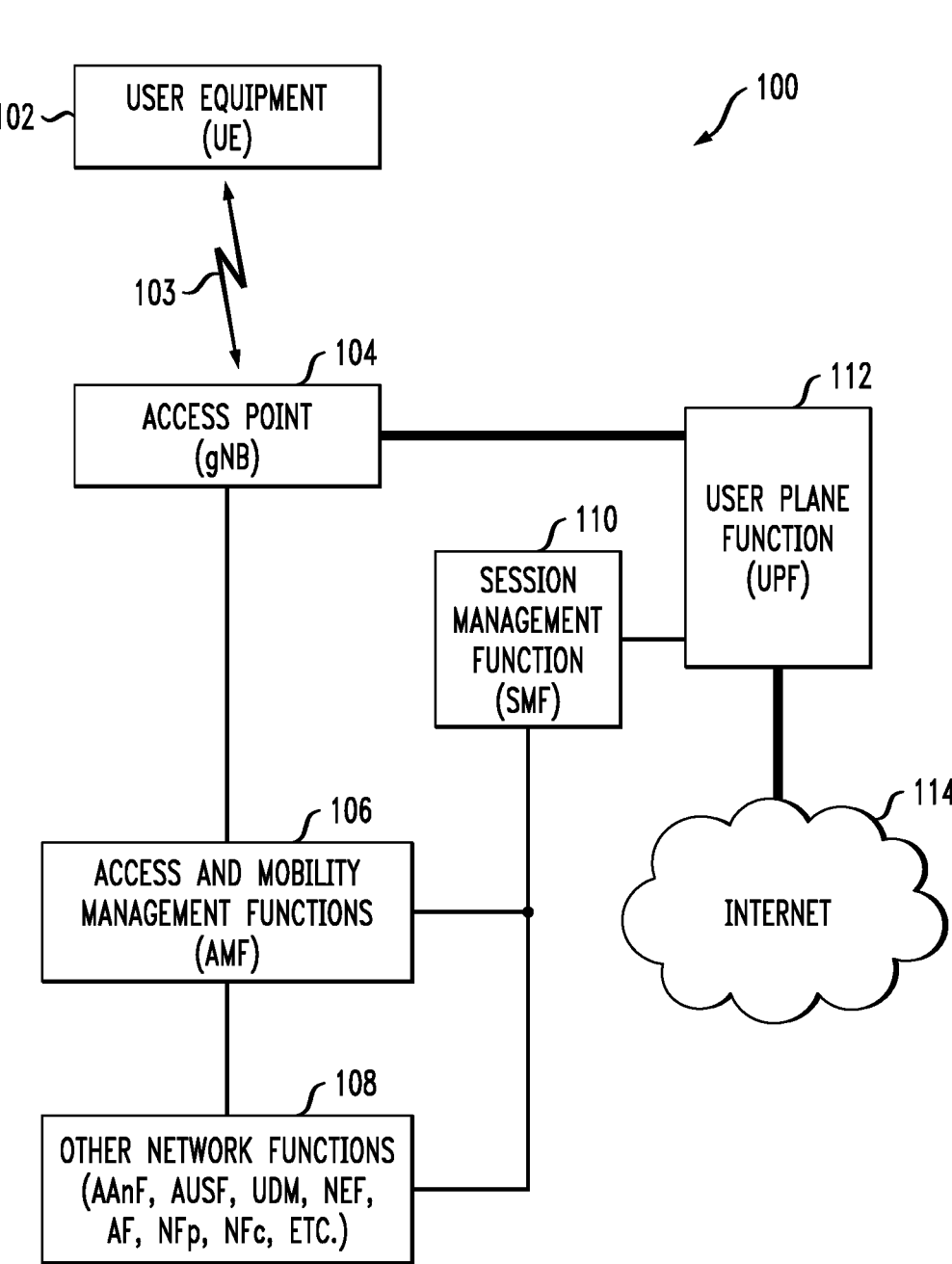
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network, an untrusted non-3GPP access network that uses an N3IWF (Non-3GPP Interworking Function), a trusted non-3GPP network that uses a TNGF (Trusted Non-3GPP Gateway Function) or wireline access that uses a W-AGF (Wireline Access Gateway Function) or may correspond to a legacy access point (e.g., eNB).

The UE 102 may be a mobile station, and such a mobile station may comprise, by way of example, a mobile telephone, a computer, an IoT device, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations.

Further, the access point 104 in this illustrative embodiment is operatively coupled to an Access and Mobility Management Function (AMF) 106. In a 5G network, the AMF supports, inter alia, mobility management (MM) and security anchor (SEAF) functions.

AMF 106 in this illustrative embodiment is operatively coupled to (e.g., uses the services of) other network functions 108. As shown, some of these other network functions 108 include, but are not limited to, and an Authentication and Key Management for Applications (AKMA) Anchor Function (AAnF) as will be further explained below, an Authentication Server Function (AUSF), a Unified Data Management (UDM) function, a Network Exposure Function (NEF), an Application Function (AF), and other network functions that can act as service producers (NFp) and/or service consumers (NFc). Note that any network function can be a service producer for one service and a service consumer for another service. Further, when the service being provided includes data, the data-providing NFp is referred to as a data producer, while the data-requesting NFc is referred to as a data consumer. A data producer may also be an NF that generates data by modifying or otherwise processing data produced by another NF.

Note that a UE, such as UE 102, is typically subscribed to what is referred to as a Home Public Land Mobile Network (HPLMN) in which some or all of the functions 106 and 108 reside. Alternatively the UE, such as UE 102, may receive services from a non-Public Network (NPN) where these functions may reside. The HPLMN is also referred to as the Home Environment (HE). If the UE is roaming (not in the HPLMN), it is typically connected with a Visited Public Land Mobile Network (VPLMN) also referred to as a visited network, while the network that is currently serving the UE is also referred to as a serving network. In the roaming case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein are not necessarily limited by which functions reside in which PLMN (i.e., HPLMN or VPLMN).

The access point 104 is also operatively coupled (via one or more of functions 106 and/or 108) to a Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that network 114 in FIG. 1 may additionally or alternatively represent other network infrastructures including, but not limited to, cloud computing infrastructure and/or edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) are logical networks that provide specific network capabilities and network characteristics that can support a corresponding service type, optionally using network function virtualization (NFV) on a common physical infrastructure. With NFV, network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
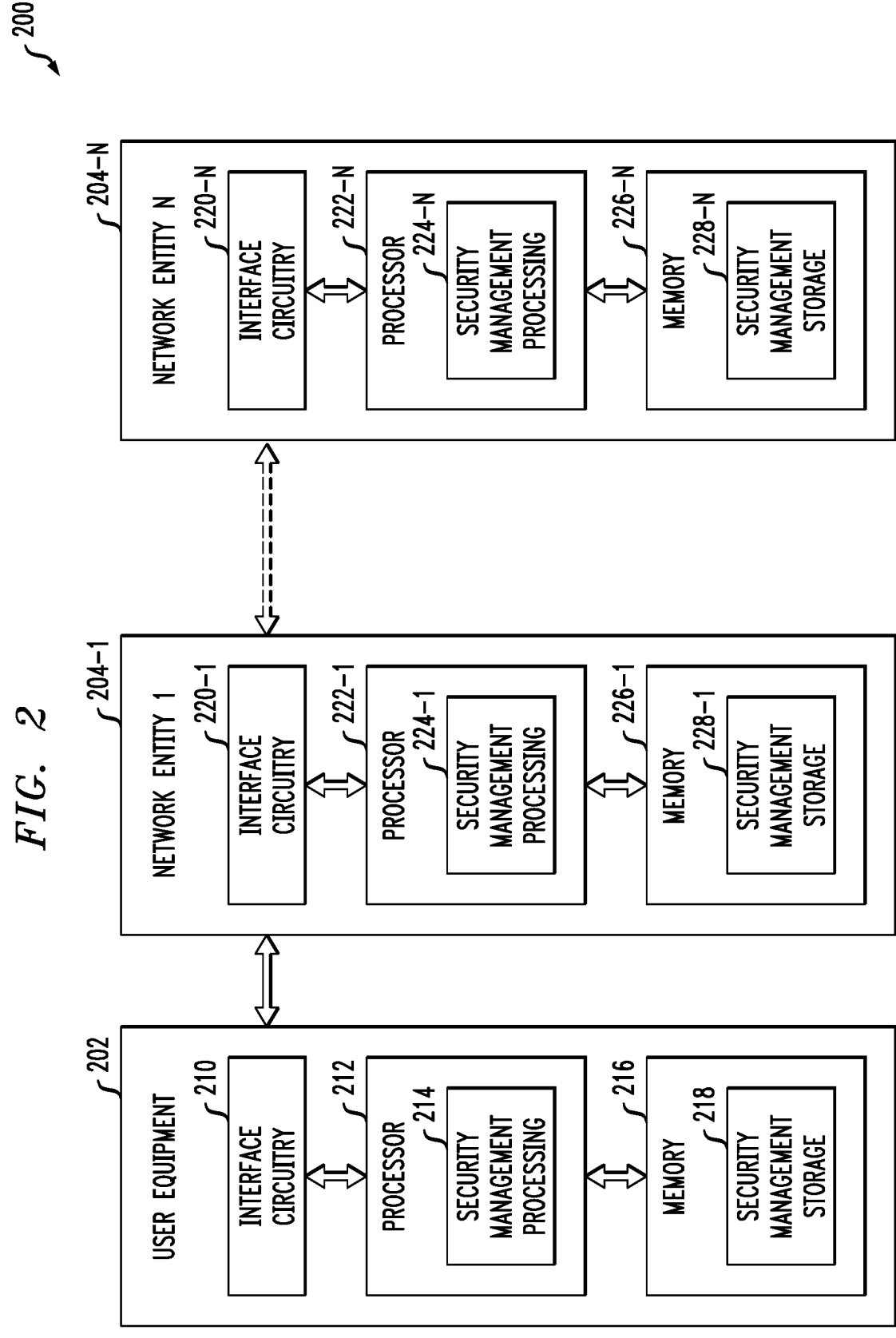
FIG. 2 illustrates user equipment and network entities with which one or more illustrative embodiments may be implemented.

FIG. 2 is a block diagram illustrating computing architectures for various participants in methodologies according to illustrative embodiments. More particularly, system 200 is shown comprising user equipment (UE) 202 and a plurality of network entities 204-1, . . . . , 204-N. For example, in illustrative embodiments and with reference back to FIG. 1, UE 202 can represent UE 102, while network entities 204-1, . . . , 204-N can represent functions 106 and 108. It is to be appreciated that the UE 202 and network entities 204-1, . . . . , 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

Each of the network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each network entity 204 includes a security management processing module 224 (224-1, . . . , 224-N) that may be implemented at least in part in the form of software executed by the processor 222. The processing module 224 performs security management operations described in conjunction with subsequent figures and otherwise herein. Each memory 226 of each network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of network entities 204 are configured for communication with each other as security management participants via their respective interface circuitries 210 and 220. This communication involves each participant sending data to and/or receiving data from one or more of the other participants. The term "data" as used herein is intended to be construed broadly, so as to encompass any type of information that may be sent between participants including, but not limited to, identity data, key pairs, key indicators, security management messages, registration request/response messages and data, request/response messages, authentication request/response messages and data, metadata, control data, audio, video, multimedia, consent data, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5G core network architecture as service-based, e.g., Service-Based Architecture (SBA). It is realized herein that in deploying different NFs, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces).

Given the above general description of some features of a 5G network, problems with existing security (e.g., authentication and key management for applications) approaches and solutions proposed in accordance with illustrative embodiments will now be described herein below.

As will be illustratively used herein, the following additional acronyms have the following meanings:

A-KID AKMA Key IDentifier
A-TID AKMA Temporary UE IDentifier
AAnF AKMA Anchor Function
AKMA Authentication and Key Management for Applications
$K_{AF}$ AKMA Application Function Key
$K_{AKMA}$ AKMA Anchor Key
KDF Key Derivation Function
RID Routing InDicator AKMA is Authentication and Key Management for Applications. The data in the home operator's network indicating whether or not the subscriber is allowed to use AKMA is known as AKMA subscription data. AKMA context which is maintained in a network entity known as an AAnF has a set of parameters such as SUPI, $K_{AKMA}$ and A-KID. The above-referenced TS 33.535 specifies the derivation of the AKMA key after primary authentication and derivation of the AKMA application key for a specific AF which are respectively described below in the context of FIGS. 3A and 3B.

Figure 3A:
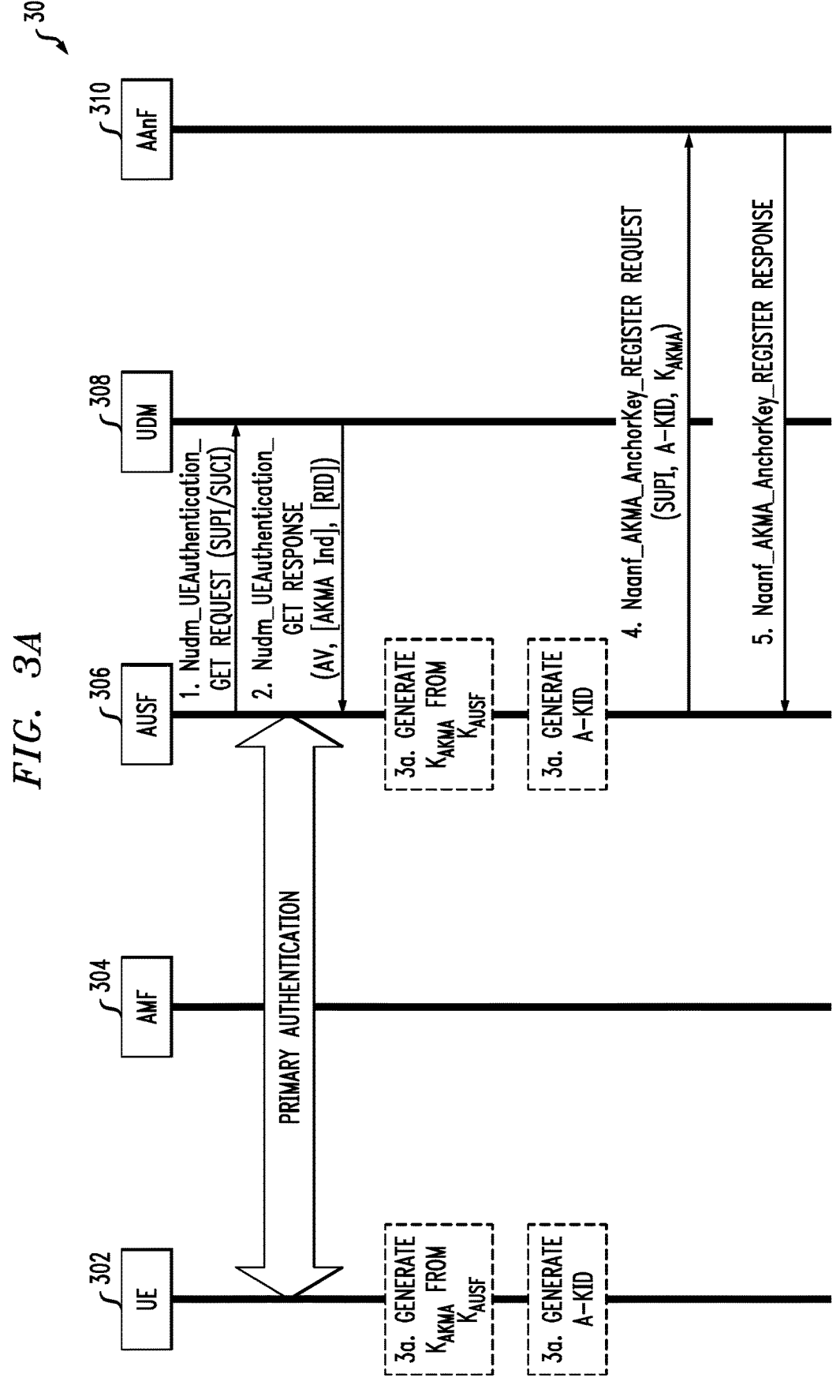
FIG. 3A illustrates a procedure associated with authentication and key management for applications with which one or more illustrative embodiments can be implemented.

FIG. 3A illustrates a procedure 300 for derivation of the AKMA key after primary authentication. As shown, procedure 300 involves a UE 302, an AMF 304, an AUSF 306, a UDM 308, and an AAnF 310. Note that there is no separate authentication of UE 302 to support AKMA functionality. Instead, AKMA reuses the 5G primary authentication procedure executed, e.g., during UE registration to authenticate UE 302. A successful 5G primary authentication results in $K_{AUSF}$ being stored at AUSF 306 and UE 302. Thus, FIG. 3A shows procedure 300 to derive $K_{AKMA}$ (after a successful primary authentication) in the context of steps 1-5.

Step 1. During the primary authentication procedure, AUSF 306 interacts with UDM 308 in order to fetch authentication information such as subscription credentials (e.g., AKMA authentication vectors) and the authentication method using the Nudm_UEAuthentication_Get Request service operation.

Step 2. In the response, UDM 308 may also indicate to AUSF 306 whether AKMA anchor keys need to be generated for UE 302. If the AKMA indication (Ind) is included, UDM 308 also includes the RID of UE 302.

Steps 3a and 3b. If AUSF 306 receives the AKMA indication from UDM 308, AUSF 306 stores $K_{AUSF}$ (note that K generally refers to a key, such as a cryptographic key, and the subscript refers to a function, purpose, and/or source, of the key) and generates the AKMA anchor key ($K_{AKMA}$) and the A-KID from $K_{AUSF}$ after the primary authentication procedure is successfully completed. Also, UE 302 generates the AKMA anchor key ($K_{AKMA}$) and the A-KID from the $K_{AUSF}$ before initiating communication with an AKMA application function (AF).

Step 4. After AKMA key material is generated, AUSF 306 selects an AAnF as defined in the above-referenced TS 33.535, i.e., AAnF 310 in this example, and sends the generated A-KID, and $K_{AKMA}$ to AAnF 310 together with the SUPI of UE 302 using the Naanf_AKMA_KeyRegistration Request service operation. AAnF 310 stores the latest information sent by AUSF 306. Note that AUSF 306 need not store any AKMA key material after delivery to AAnF 310. Further note that when a need for reauthentication occurs, in the existing procedure, AUSF 306 generates a new A-KID, and a new $K_{AKMA}$ and sends the new generated A-KID and $K_{AKMA}$ to AAnF 310. After receiving the new generated A-KID and $K_{AKMA}$, AAnF 310 deletes the old A-KID and $K_{AKMA}$ and stores the new generated A-KID and $K_{AKMA}$.

Step 5. AAnF 310 sends a response to AUSF 306 using the Naanf_AKMA_AnchorKey_Register Response service operation.

Note that A-KID identifies the $K_{AKMA}$ key of UE 302. A-KID is in NAI format, i.e., username@realm. The username part includes RID and A-TID (AKMA Temporary UE Identifier), and the realm part includes the Home Network Identifier. A-TID is derived from $K_{AUSF}$ as specified in the above-referenced TS 33.535. AUSF 306 uses the RID received from UDM 308 as described in step 2 to derive A-KID. Note that the chance of an A-TID collision is not zero but practically low as the A-TID derivation is based on a KDF specified in the above-referenced TS 33.220. The detection of an A-TID collision as well as potential handling of the collision is not expressly addressed herein. $K_{AKMA}$ is derived from $K_{AUSF}$ as specified in the above-referenced TS 33.535. Since $K_{AKMA}$ and A-TID in A-KID are both derived from $K_{AUSF}$ based on the primary authentication run, in the existing procedure, $K_{AKMA}$ and A-KID can only be refreshed by a new successful primary authentication.

Figure 3B:
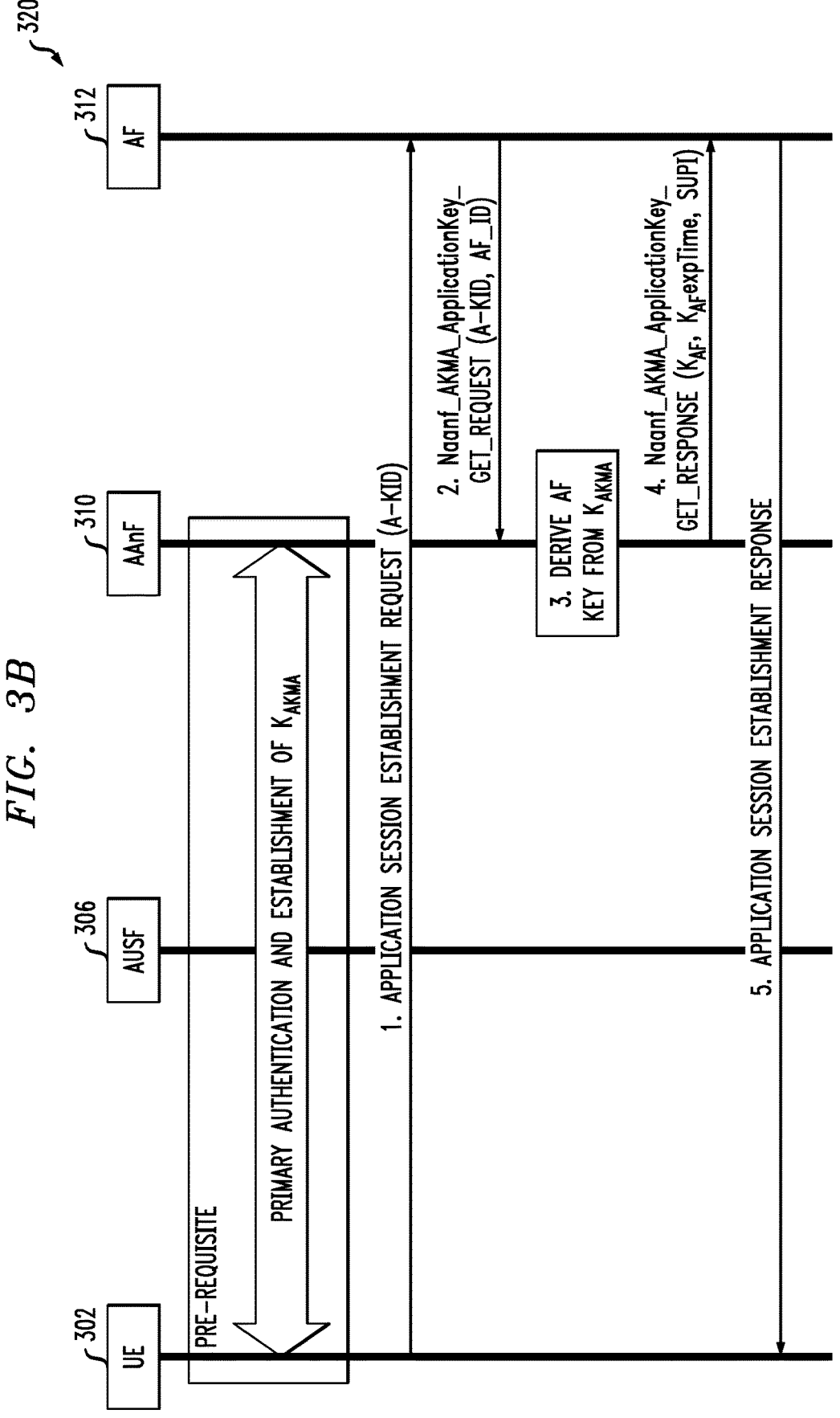
FIG. 3B illustrates another procedure associated with authentication and key management for applications with which one or more illustrative embodiments can be implemented.

FIG. 3B illustrates a procedure 320 for derivation of the AKMA application function key for a specific AF 312. Note that the other participants in procedure 320 are the same as described above in the context of procedure 300 in FIG. 3A. More particularly, FIG. 3B shows steps 1-5 in procedure 320 used by an AF 312 to request application function specific AKMA keys from AAnF 310, when AF 312 is located inside the operator's network.

Before communication between UE 302 and AF 312 can start, UE 302 and AF 312 need to know whether to use AKMA. This knowledge is implicit to the specific application on UE 302 and AF 312 or indicated by AF 312 to UE 302.

Step 1. UE 302 generates the AKMA anchor key ($K_{AKMA}$) and A-KID from $K_{AUSF}$ before initiating communication with AF 312 (the AKMA application function). When UE 302 initiates communication with AF 312, it includes the derived A-KID in the Application Session Establishment Request message. UE 302 may derive $K_{AF}$ before sending the message or afterwards.

Step 2. If AF 312 does not have an active context associated with A-KID, then AF 312 selects an AAnF, i.e., AAnF 310 in this example, and sends a Naanf_AKMA_ApplicationKey_Get request to AAnF 310 with A-KID to request $K_{AF}$ for UE 302. AF 312 also includes its identity (AF_ID) in the request.

AF_ID consists of the fully qualified domain name (FQDN) of the AF and the Ua* security protocol identifier. The latter parameter identifies the security protocol that the AF will use with the UE.

AAnF 310 checks whether it can provide the service to AF 312 based on the configured local policy or based on the authorization information or policy provided by a Network Repository Function (NRF, not explicitly shown) using the AF_ID. If it succeeds, the following steps are executed. Otherwise, AAnF 310 rejects the procedure:

AAnF 310 verifies whether the subscriber is authorized to use AKMA based on the presence of the UE specific $K_{AKMA}$ key identified by A-KID.

If $K_{AKMA}$ is present in AAnF 310, then AAnF 310 continues with step 3.

If $K_{AKMA}$ is not present in AAnF 310, then AAnF 310 continues with step 4 with an error response.

Step 3. AAnF 310 derives the AKMA application key ($K_{AF}$) from $K_{AKMA}$ if it does not already have $K_{AF}$. The key derivation of $K_{AF}$ is performed as specified in the above-referenced TS 33.535.

Step 4. AAnF 310 sends Naanf_AKMA_ApplicationKey_Get response to AF 312 with SUPI, $K_{AF}$ and the $K_{AF}$ expiration time.

Step 5. AF 312 sends the Application Session Establishment Response to UE 302. If the information in step 4 indicates failure of the AKMA key request, AF 312 rejects the Application Session Establishment by including a failure cause. Afterwards, UE 302 may trigger a new Application Session Establishment request with the latest A-KID to AF 312.

It is further realized that a UE Parameters Update (UPU) procedure may be performed. The purpose of the CP solution for the update of UE parameters is to allow the HPLMN to update UE 302 with a specific set of parameters, generated and stored in UDM 308, by delivering protected UDM Update Data via NAS signalling. The HPLMN updates such parameters based on the operator policies. The UDM Update Data that UDM 308 delivers to UE 302 may contain: (i) one or more UE parameters including: the updated Default Configured NSSAI (final consumer of the parameter is the ME), and the updated Routing Indicator Data (final consumer of the parameter is the USIM); (ii) a "UE acknowledgement requested" indication; and (iii) a "re-registration requested" indication.

However, the existing approaches do not consider the scenario where the provisioned key $K_{AF}$ expired in a trusted AF or an untrusted AF for the AKMA use case. If the primary authentication is triggered due to expiry of keys in the AF, then the existing approach results in all AFs linked to this SUPI needing to update the keys.

Illustrative embodiments overcome the above and other drawbacks by providing technical solutions which affect only that particular AF alone instead of other AFs. Such technical solutions may be implemented in several illustrative embodiments.

For example, in one illustrative embodiment, when a trusted or untrusted AF key $K_{AF}$ lifetime expires (or due to one or more other reasons), the new keys are needed at the AF to provide service to the UE. The AF sends the key expiry indication toward AAnF. The AAnF generates a new RAND value and with $K_{AKMA}$ key and AF_ID, generates the new key $K_{AF}$. The generated $K_{AF}$ along with a new expiry time and the RAND value is sent to the AF. The AF further sends the RAND value to the UE, so the same $K_{AF}$ can be generated at the UE as well. Note that the RAND generated is sent from the AF to the UE via the Ua* interface.

In another illustrative embodiment, when a trusted or untrusted AF key $K_{AF}$ lifetime expires (or due to one or more other reasons), the new keys are needed to continue the session. The AF sends the key expiry indication toward AAnF. The AAnF generates a new RAND value and with $K_{AKMA}$ key and AF_ID, generates the new key $K_{AF}$. The AAnF sends the key update request message to the UDM with a newly generated RAND value. The UDM uses the UPU procedure to securely share the AF_ID and RAND value to the UE. The UE newly generates the $K_{AF}$ based on received parameters. After the acknowledgement is received for UPU, i.e., the update is successful, the UDM sends a key update response to the AAnF. The AAnF passes the previously generated $K_{AF}$ to the AF, only after the UE update is successful.

In yet another illustrative embodiment, a combination of the above two procedures can be used.

In accordance with illustrative embodiments, when deriving $K_{AF}$ from $K_{AKMA}$, the following parameters can be used to form the input S to the KDF:

FC=0x82;
PO=AF_ID;
LO=length of AF_ID;
P1=RAND;
L1=length of RAND (i.e., 0x00 0x10);

The input key is $K_{AKMA}$. AF_ID is constructed as follows:
AF_ID=FQDN of the AF II Ua* security protocol identifier, where the Ua* security protocol identifier is specified as Ua security protocol identifier in the above-referenced TS 33.220.

Figure 4:
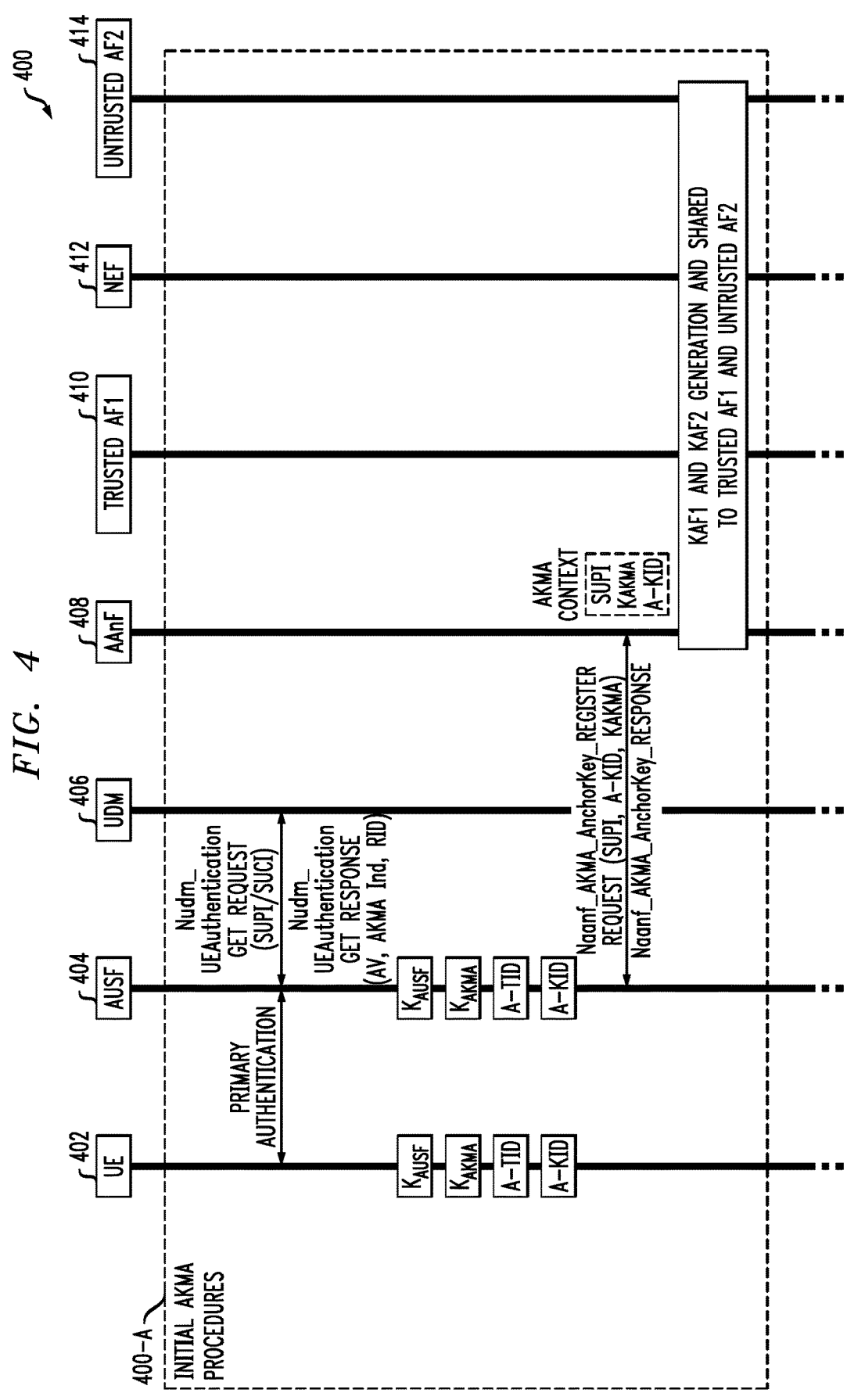
FIG. 4 illustrates rekeying without reauthentication for an authentication and key management for applications procedure according to an illustrative embodiment.
Figure 4:
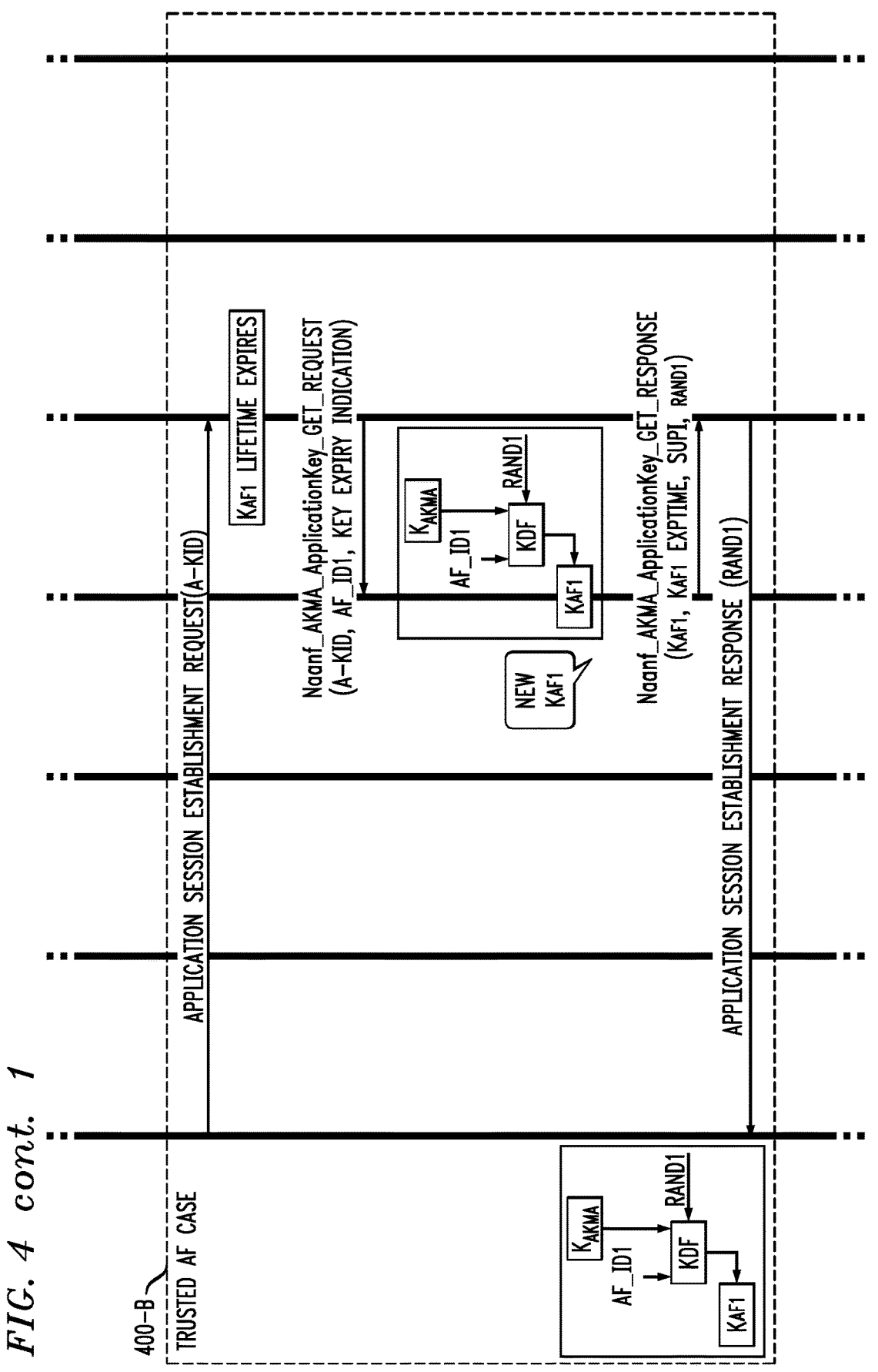
Figure 4:
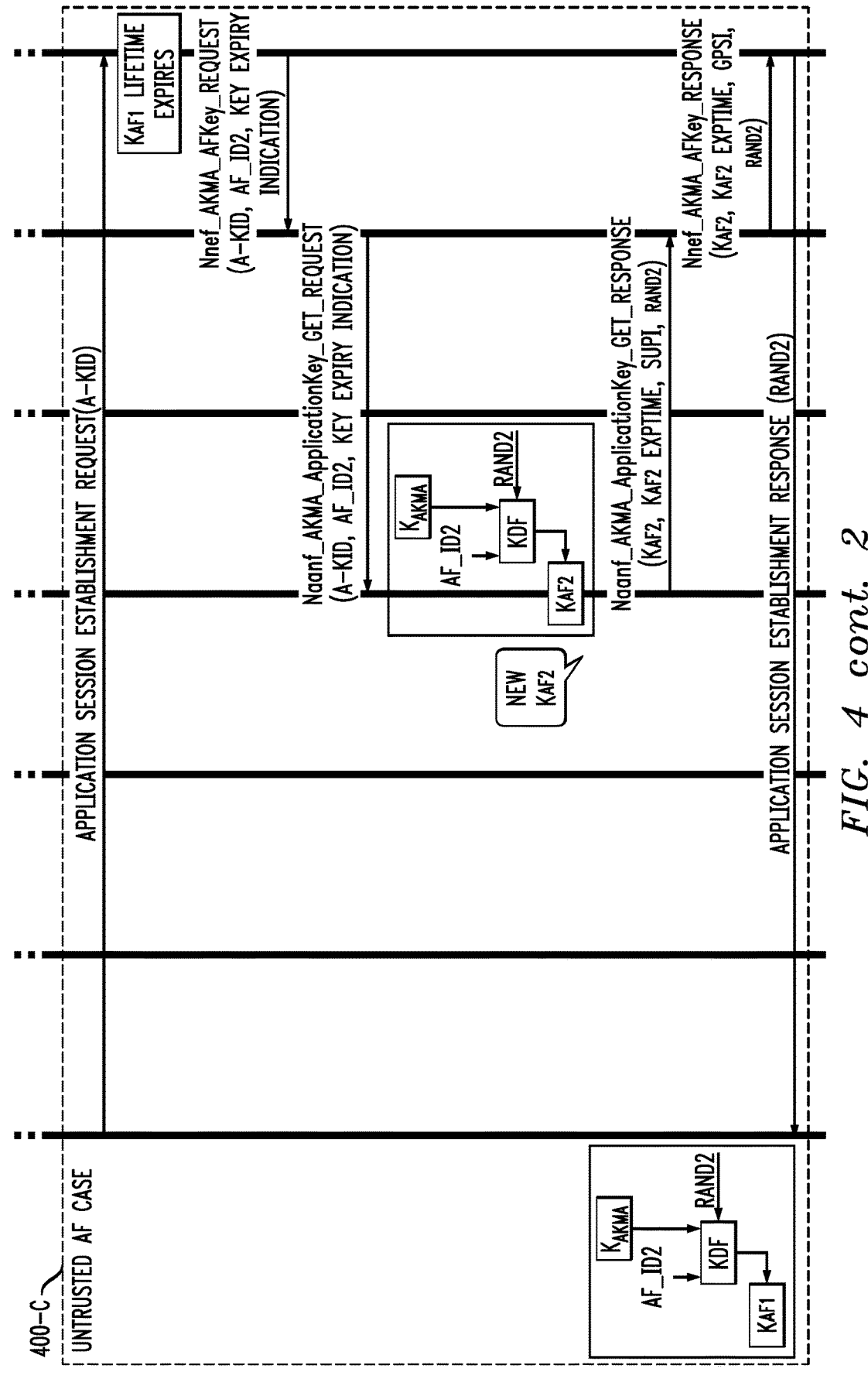

Turning now to FIG. 4, rekeying without reauthorization for an authentication and key management for applications procedure 400 is shown according to an illustrative embodiment. More particularly, FIG. 4 illustrates AKMA rekeying without re-authentication using the Ua* interface. As shown, procedure 400 involves a UE 402, an AUSF 404, a UDM 406, an AAnF 408, a trusted AF 410 (AF1), a NEF 412, and an untrusted AF 414 (AF2). Furthermore, procedure 400 comprises three use cases: initial AKMA procedures use case 400-A; a trusted AF use case 400-B; and an untrusted AF use case 400-C. Each use case will be explained in detail below.

Initial AKMA procedures use case 400-A.

During the primary authentication procedure, UDM 406 passes the AKMA indication value, set to true or false, and the routing indicator value (which is used in A-KID generation and discovering the suitable AAnF instance, in this example, AAnF 408) to AUSF 404.

After the authentication is successful, the AMKA key and A-KID are generated at AUSF 404.

AUSF 404 passes information such as SUPI, A-KID and $K_{AKMA}$ to AAnF 408.

AKMA context is maintained in AAnF 408 with received information from AUSF 404.

AAnF 408 generates a different set of $K_{AF}$ keys and shares it to AFs 410 and 414, i.e., AF1 receives $K_{AF1}$ and AF2 receives $K_{AF2}$.

Trusted AF use case 400-B.

When UE 402 tries to start a session with AF1 (trusted AF 410), it sends an application session establishment request with A-KID towards AF1 via Ua* interface.

AF1 checks for the expiry time for $K_{AF1}$ and if it has expired, then AF1 triggers an AKMA application key get request with AK-KID, AF_ID1, and a key expiry indication.

AAnF 408 generates a new RAND1 value and with existing $K_{AKMA}$ and AF_ID1, a new key $K_{AF1}$ is generated.

The newly generated key, expiry time, SUPI and the generated RAND1 are sent to AF1 with the response message.

AF1 sends the application session establishment response with RAND1 to UE 402 via the Ua* interface.

UE 402 uses the same parameters such as $K_{AKMA}$, AF_ID1, and RAND1 to generate the new key $K_{AF1}$.

Untrusted AF use case 400-C.

When UE 402 tries to start a session with AF2 (untrusted AF 414), it sends an application session establishment request with A-KID towards AF2 via the Ua* interface.

AF2 checks for the expiry time for the $K_{AF2}$ and if it has expired, then AF2 triggers an AKMA application key get request with AK-KID, AF_ID2, and a key expiry indication. NEF 412 forwards the request from AF2 to AAnF 408.

AAnF 408 generates a new RAND2 value and with existing parameters in AKMA context K AKMA and received AF_ID2, a new key $K_{AF2}$ is generated.

The newly generated key, expiry time, SUPI, and the generated RAND2 are sent to AF2 with the response message via NEF 412.

AF2 sends the application session establishment response with RAND2 to UE 402 via Ua* interface.

UE 402 uses the same parameters such as $K_{AKMA}$, AF_ID2, and RAND2 to generate a new key $K_{AF2}$.

Figure 5:
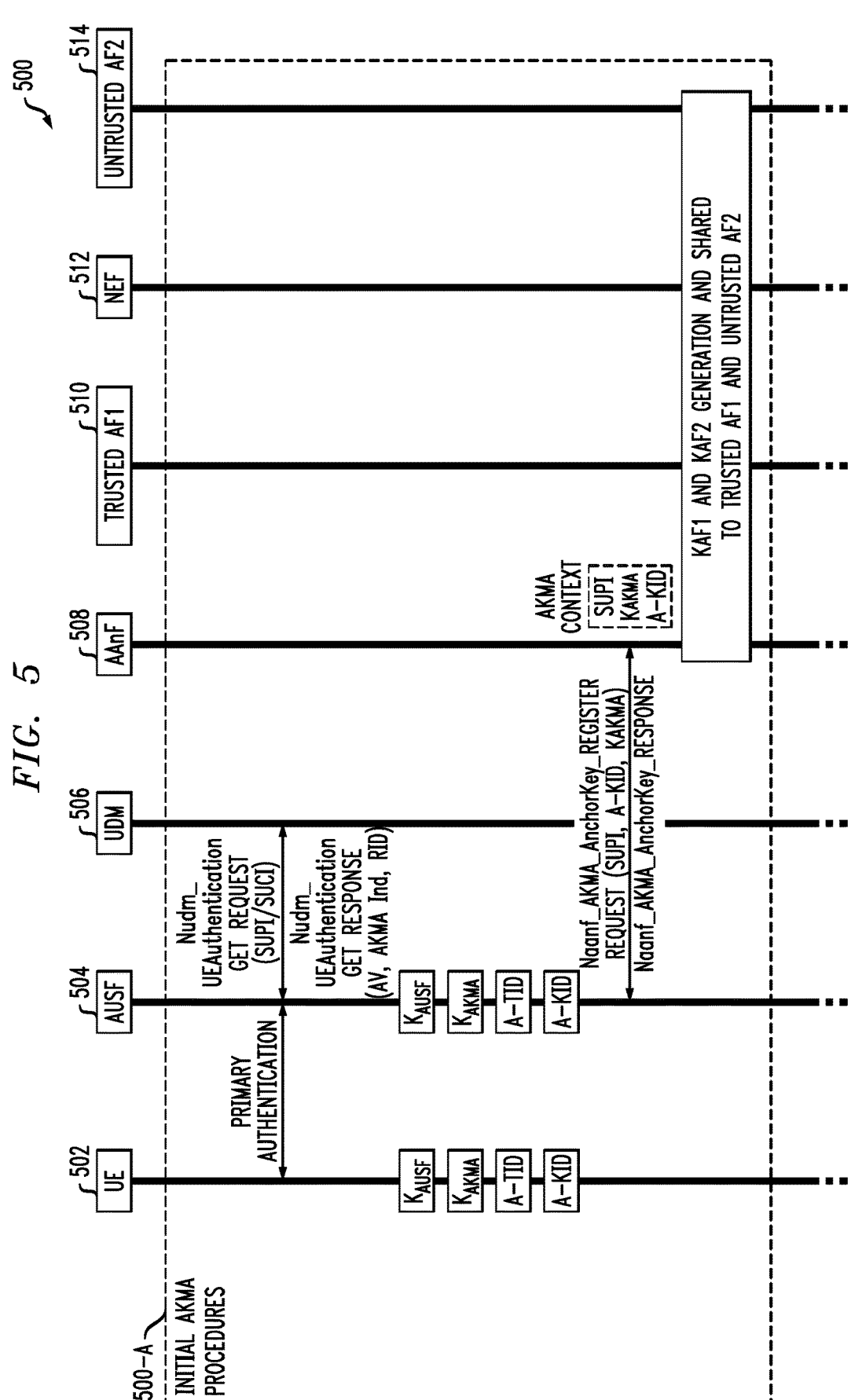
FIG. 5 illustrates rekeying without reauthentication for an authentication and key management for applications procedure according to another illustrative embodiment.
Figure 5:
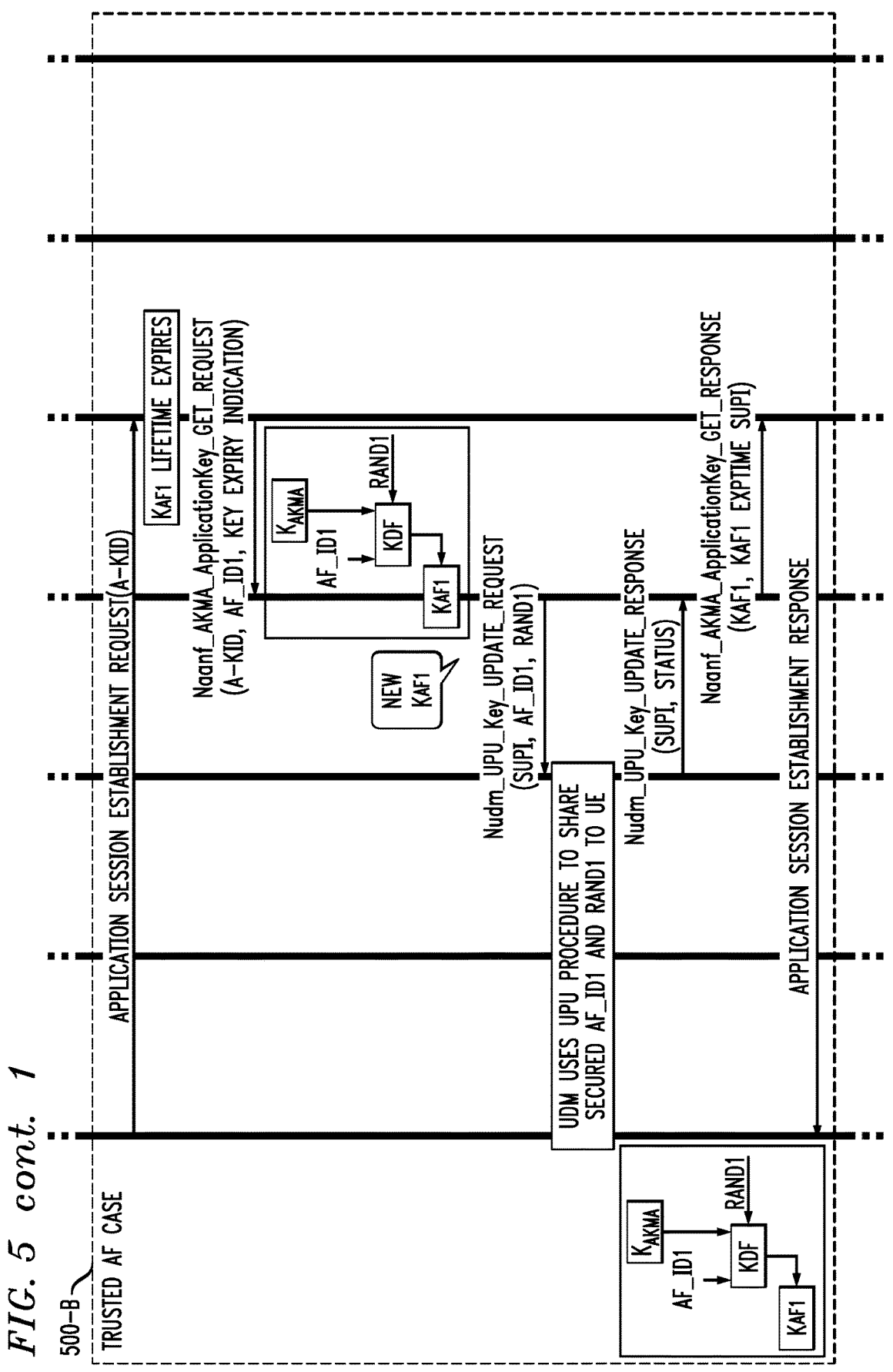
Figure 5:
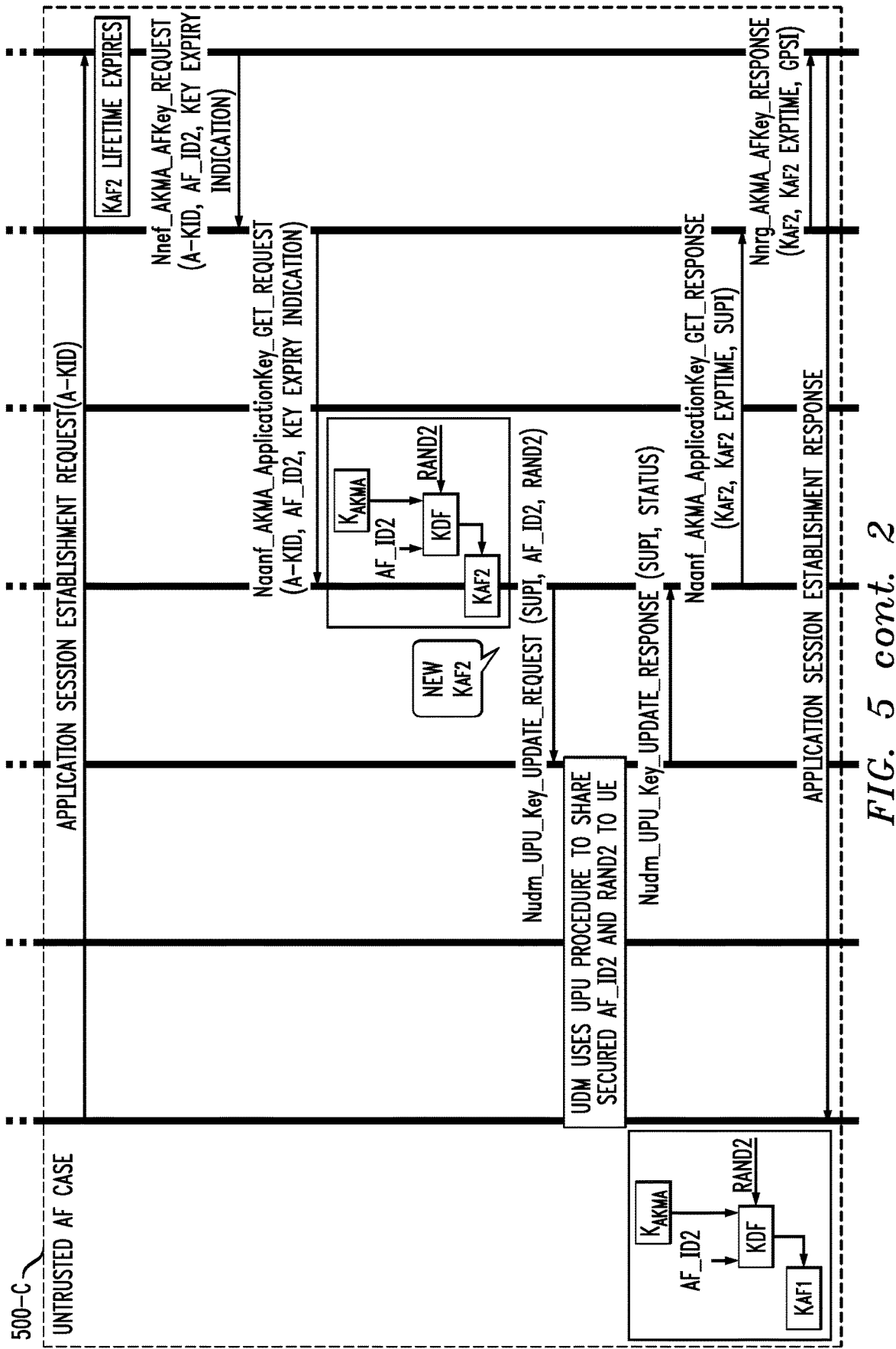

Lastly, FIG. 5 illustrates rekeying without reauthorization for an authentication and key management for applications procedure 500 according to an illustrative embodiment. More particularly, FIG. 4 illustrates AKMA rekeying without re-authentication using UPU interface. As shown, procedure 500 involves a UE 502, an AUSF 504, a UDM 506, an AAnF 508, a trusted AF 510 (AF1), a NEF 512, and an untrusted AF 514 (AF2). Furthermore, procedure 500 comprises three use cases: initial AKMA procedures use case

500-A; a trusted AF use case 500-B; and an untrusted AF use case 500-C. Each use case will be explained in detail below.

Initial AKMA procedures use case 500-A.

During the primary authentication procedure, UDM 506 passes the AKMA indication value, set to true or false, and the routing indicator value (which is used in A-KID generation and discovering the suitable AAnF instance, in this example, AAnF 508) to AUSF 504.

After the authentication is successful, the AMKA key and A-KID are generated at AUSF 504.

AUSF 504 passes information such as SUPI, A-KID and $K_{AKMA}$ to AAnF 508.

AKMA context is maintained in AAnF 508 with received information from AUSF 504.

AAnF 508 generates a different set of $K_{AF}$ keys and shares it to AFs 510 and 514, i.e., AF1 receives $K_{AF1}$ and AF2 receives $K_{AF2}$.

Trusted AF use case 500-B.

When UE 502 tries to start a session with AF1 (trusted AF 510), it sends the application session establishment request with A-KID towards AF1 via Ua* interface.

AF1 checks for the expiry time for $K_{AF1}$ and if it has expired, then AF1 triggers an AKMA application key get request with AK-KID, AF_ID1, and key expiry indication.

AAnF 508 generates a new RAND1 value and with existing $K_{AKMA}$, AF_ID1, a new key $K_{AF1}$ is generated.

AAnF 508 sends a key update request message with SUPI, AF_ID1 and generated RAND1 to UDM 506.

UDM 506 uses the UPU procedure (currently only supports sending default configured NSSAI and routing indicator data) to newly share the RAND1 and AF_ID1 securely to UE 502. The existing UPU framework is re-used but with the extension of these new parameters.

UE 502 receives the RAND1, AF_ID1 and generated key $K_{AF1}$.

UDM 506 receives the acknowledgement from UE 502 for UPU updates.

Newly generated key $K_{AF1}$, expiry time, and SUPI are sent to AF1 with the application key response message.

AF1 sends back the application session establishment response message to UE 502.

Untrusted AF use case 500-C.

When UE 502 tries to start a session with AF2 (untrusted AF 514), it sends the application session establishment request with A-KID towards AF2 via Ua* interface.

AF2 checks for the expiry time for $K_{AF2}$ and if it has expired, then AF2 triggers an AKMA application key get request with AK-KID, AF_ID2 and key expiry indication towards NEF 512. NEF 512 forwards the request to AAnF 508.

AAnF 508 generates a new RAND2 value and with existing $K_{AKMA}$, AF_ID2, a new key $K_{AF2}$ is generated.

AAnF 508 sends a key update request message with SUPI, AF_ID2 and generated RAND2 to UDM 506.

UDM 506 uses the UPU procedure (currently only supports sending default configured NSSAI and routing indicator data) to newly share the RAND2 and AF_ID2 securely to UE 502. The existing UPU framework and signal is re-used but with the extension of these new parameters.

UE 502 receives the RAND2, AF_ID2 and generated Key $K_{AF2}$.

UDM 506 receives the acknowledgement from UE 502 for UPU updates.

Newly generated key $K_{AF2}$, expiry time, and SUPI are sent to AF2 with the application key response message.

AF2 sends back the application session establishment response message to UE 502.

It is to be appreciated that procedure 400 of FIG. 4 and procedure 500 of FIG. 5 can be combined in an additional illustrative embodiment. If the Ua* protocol does not support informing the UE about the new RAND value (plus other values), then the AF indicates the same to the AAnF. Then, the AAnF initiates procedure 500 of FIG. 5. If the Ua* protocol supports informing the UE about the new RAND value (plus other values), then the AF informs the same to the AAnF. Then, the AAnF initiates procedure 400 of FIG. 4.

Advantageously, upon expiration of the previous application function key and rekeying with a new application function key as explained herein in accordance with illustrative embodiments, the UE (e.g., 402/502) and the AF (e.g., 410/510 or 414/514) continue the session because both now have valid keys. In one illustrative embodiment, the UE can resend the request to the same AF to restart the communication.

As used herein, it is to be understood that the term "communication network" in some embodiments can comprise two or more separate communication networks. Further, the particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
at least one processor and at least one memory including computer program code;
the at least one memory and the computer program code being configured to, with the at least one processor, cause the apparatus at least to:
receive an indication from an application function that a first expiry time of a first application function key, configured to enable user equipment to participate in a session with the application function, has expired, the first application function key being generated using a first random value and one or more parameters of a current Authentication and Key Management for Applications (AKMA) context associated with the user equipment; and
generate a second application function key for the application function, using a second random value and based on the one or more parameters of the current AKMA context associated with the user equipment, with a second expiry time.

2. The apparatus of claim 1, wherein the one or more parameters of the current AKMA context associated with the user equipment comprise an identifier of the application function and an AKMA anchor key.

3. The apparatus of claim 1, wherein the at least one memory and the computer program code are further configured to, with the at least one processor, cause the apparatus to send the second application function key, the second random value, and the second expiry time to the application function.

4. The apparatus of claim 1, wherein the at least one memory and the computer program code are further configured to, with the at least one processor, cause the apparatus to send the second random value in a key update request to a network entity configured to provide a unified data management function.

5. The apparatus of claim 4, wherein the at least one memory and the computer program code are further configured to, with the at least one processor, cause the apparatus to receive a key update response from the network entity.

6. The apparatus of claim 5, wherein the at least one memory and the computer program code are further configured to, with the at least one processor, cause the apparatus to, when the key update response is indicative that the user equipment successfully generated the second application function key based on updated parameters provided thereto by the network entity, send the second application function key, the second random value, and the second expiry time to the application function.

7. The apparatus of claim 1, wherein the at least one memory and the computer program code are further configured to, with the at least one processor, cause the apparatus to determine which one of a plurality of procedures to initiate to update the user equipment with the second random value, wherein the determination is based on a security protocol supported by the user equipment.

8. A method comprising:
receiving, at a network entity configured to provide an anchor function, an indication from an application function that a first expiry time of a first application function key, configured to enable user equipment to participate in a session with the application function, has expired, the first application function key being generated using a first random value and one or more parameters of a current Authentication and Key Management for Applications (AKMA) context associated with the user equipment; and
generating, at the network entity, a second application function key for the application function, using a second random value and the one or more parameters of the current AKMA context associated with the user equipment, with a second expiry time.

9. An article of manufacture comprising a non-transitory computer-readable storage medium having embodied therein executable program code that when executed by a processor causes the processor to perform the step of claim 8.

10. An apparatus comprising:
at least one processor and at least one memory including computer program code;
the at least one memory and the computer program code being configured to, with the at least one processor, cause the apparatus at least to:
send, to a network entity configured to provide an anchor function, an indication that a first expiry time of a first application function key, configured to enable user equipment to participate in a session with the apparatus, has expired, the first application function key being generated by the network entity using a first random value and one or more parameters of a current Authentication and Key Management for Applications (AKMA) context associated with the user equipment; and receive, from the network entity, a second application function key, a second random value, and a second expiry time, wherein the second application function key is generated by the network entity using the second random value and the one or more parameters of the current AKMA context associated with the user equipment.

11. The apparatus of claim 10, wherein the at least one memory and the computer program code are further configured to, with the at least one processor, cause the apparatus to send the second random value to the user equipment to enable the user equipment to generate the second application function key.

12. The apparatus of claim 10, wherein the second application function key, the second random value, and the second expiry time, are received from the network entity following the network entity receiving an indication that the user equipment successfully generated the second application function key based on updated parameters.

13. An apparatus comprising:
   at least one processor and at least one memory including computer program code;
   the at least one memory and the computer program code being configured to, with the at least one processor, cause the apparatus at least to:
   in response to expiration of a first application function key generated based on a first random value and one or more parameters of a current Authentication and Key Management for Applications (AKMA) context associated with the apparatus the apparatus to participate in a session with an application function, receive a second random value; and
generate a second application function key based on the second random value and the one or more parameters of the current AKMA context associated with the apparatus.

14. The apparatus of claim 13, wherein the second random value is received from the application function.

15. The apparatus of claim 13, wherein the second random value is received from a network entity configured to operate as a unified data management function.

16. The apparatus of claim 15, wherein the at least one memory and the computer program code are further configured to, with the at least one processor, cause the apparatus to send an indication of successful generation of the second application function key to the network entity.

17. The apparatus of claim 13, wherein the at least one memory and the computer program code are further configured to, with the at least one processor, cause the apparatus to re-initiate communication with the application function based on the generated second application function key.

18. The apparatus of claim 13, wherein the one or more parameters of the current AKMA context associated with the apparatus comprise an identifier of the application function and an AKMA anchor key.

19. The method of claim 8, wherein the one or more parameters of the current AKMA context associated with the user equipment comprise an identifier of the application function and an AKMA anchor key.

20. The apparatus of claim 10, wherein the one or more parameters of the current AKMA context associated with the user equipment comprise an identifier of the application function and an AKMA anchor key.

* * * * *